(12) United States Patent
Tamura et al.

(10) Patent No.: US 6,311,199 B1
(45) Date of Patent: Oct. 30, 2001

(54) SIGN EXTENSION UNIT

(75) Inventors: Naoyuki Tamura; Takeshi Yoshida, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/199,281

(22) Filed: Nov. 25, 1998

(30) Foreign Application Priority Data

Nov. 26, 1997 (JP) .................................................. 9-324884

(51) Int. Cl.[7] ...................................................... G06F 5/00
(52) U.S. Cl. ............................................. 708/204; 708/513
(58) Field of Search ..................................... 708/204, 513

(56) References Cited

U.S. PATENT DOCUMENTS

| | | | | |
|---|---|---|---|---|
| 5,497,341 | * | 3/1996 | Cohen | 708/706 |
| 5,523,961 | * | 6/1996 | Naini | 708/513 |
| 6,065,034 | * | 5/2000 | Mahurin | 708/204 |

* cited by examiner

*Primary Examiner*—David H. Malzahn
(74) *Attorney, Agent, or Firm*—Foley & Lardner

(57) ABSTRACT

A sign extension unit has first and second sign extenders to extend a sign bit, i.e., the most significant bit of input data to the higher side of the input data. The input data is divided into n-bit blocks. The first sign extender carries out sign extension based on highest bits of the blocks, and the second sign extender carries out sign extension in each of the blocks based on the highest bits of the respective blocks.

7 Claims, 6 Drawing Sheets

SIGN EXTENSION UNIT

BACKGROUND OF THE INVENTION

1. Field of the Invention

The present invention relates to a sign extension unit for extending a sign bit, i.e., the most significant bit of input data to the higher side of the input data.

2. Description of Related Art

FIG. 1 shows a sign extension circuit 301 according to a related art. The sign extension circuit 301 receives input data of byte length (8 bits), half-word length (16 bits), word length (32 bits), or double-word length (64 bits) and extends a sign bit thereof to form signed 64-bit output data. The circuit 301 has selectors MM8 to MM63 to receive input data consisting of bits IN0 to IN63 at the maximum. The selectors MM8 to MM15 select the bit IN7 or the bits IN(8+n) (n=0 to 7) and provide the selected bits as output bits OUT8 to OUT15. The selectors MM16 to MM31 select the bit IN7, the bit IN15, or the bits IN(16+n) (n=0 to 15) and provide the selected bits as output bits OUT16 to OUT31. The selectors MM32 to MM63 select the bit IN7, the bit IN15, the bit IN31, or the bits (32+n) (n=0 to 31) and provide the selected bits as output bits OUT32 to OUT63. The selection made by the selectors MM8 to MM63 is based on the length of input data.

Upon receiving input data of byte length consisting of bits IN0 to IN7, the selectors MM8 to MM63 select the bit IN7 serving as a sign bit of the input data for output bits OUT8 to OUT63, and the bits IN0 to IN7 are provided as they are as output bits OUT0 to OUT7. Namely, the sign bit of the input data is extended for the output bits OUT8 to OUT63, and the output bits OUT0 to OUT63 form sign-extended 64-bit output data. Upon receiving input data of half-word length consisting of bits IN0 to IN15, the selectors MM16 to MM63 select the bit IN15 serving as a sign bit of the input data for output bits OUT16 to OUT63, the bits IN0 to IN7 are provided as they are as output bits OUT0 to OUT7, and the selectors MM8 to MM15 select the bits IN8 to IN15 as output bits OUT8 to OUT15. Namely, the sign bit of the input data is extended for the output bits OUT16 to OUT63, and the output bits OUT0 to OUT63 form sign-extended 64-bit output data. Upon receiving input data of word length consisting of bits IN0 to IN31, the selectors MM32 to MM63 select the bit IN31 serving as a sign bit of the input data for output bits OUT32 to OUT63, the bits IN0 to IN7 are provided as they are as output bits OUT0 to OUT7, and the selectors MM8 to MM31 select the bits IN8 to IN31 as output bits OUT8 to OUT31. Namely, the sign bit of the input data is extended for the output bits OUT32 to OUT63, and the output bits OUT0 to OUT63 form sign-extended 64-bit output data. Upon receiving input data of double-word length consisting of bits IN0 to IN63, the bits IN0 to IN7 are provided as they are as output bits OUT0 to OUT7, and the selectors MM8 to MM63 select the bits IN8 to IN63 as output bits OUT8 to OUT63. Namely, the input data is provided as it is as 64-bit output data.

This related art supplies an input bit IN7 to the 56 selectors MM8 to MM63. Namely, the input bit IN7 must drive the gates of the 56 selectors, and long wiring must be laid to transmit the input bit IN7 to the 56 selectors. In this way, the related art applies large load on the input bit IN7, to increase signal delay and decrease operation speed.

To solve this problem, there is an idea of inserting buffers in signal paths for transmitting the input bit IN7. The buffers, however, cause gate delay and increase the size of the circuit 301.

In addition, input bits IN15 and IN31 must drive large load, and therefore, these bits involve the same problem as the bit IN7, although the load on the bits IN15 and IN31 is relatively small compared with that on the bit IN7.

In this way, the related art applies large load on some bits of input data, to increase signal delay and decrease operation speed.

SUMMARY OF THE INVENTION

An object of the present invention is to provide a sign extension unit capable of reducing load on paths for transmitting a sign bit. Another object of the present invention is to provide a sign extension unit capable of operating at high speed.

In order to accomplish the objects, the present invention provides a sign extension unit having first and second sign extenders. Input data consisting of input bits to the sign extension unit is divided into blocks of equal number of bits. The first sign extender receives highest bits from the blocks, selects a sign bit of the input data or the received bits according to the bit length of the input data, and provides the selected bits. The second sign extender receives the input bits from the blocks except a lowest one of the blocks, selects the highest bits of the blocks or the input bits according to the bit length of the input data, and provides the selected bits.

The first sign extender may have selectors for receiving the highest bits from the blocks, selecting the received bits or the sign bit of the input data according to data length information related to the input data, and providing the selected bits.

DETAILED DESCRIPTION OF THE EMBODIMENTS

Figure 1:
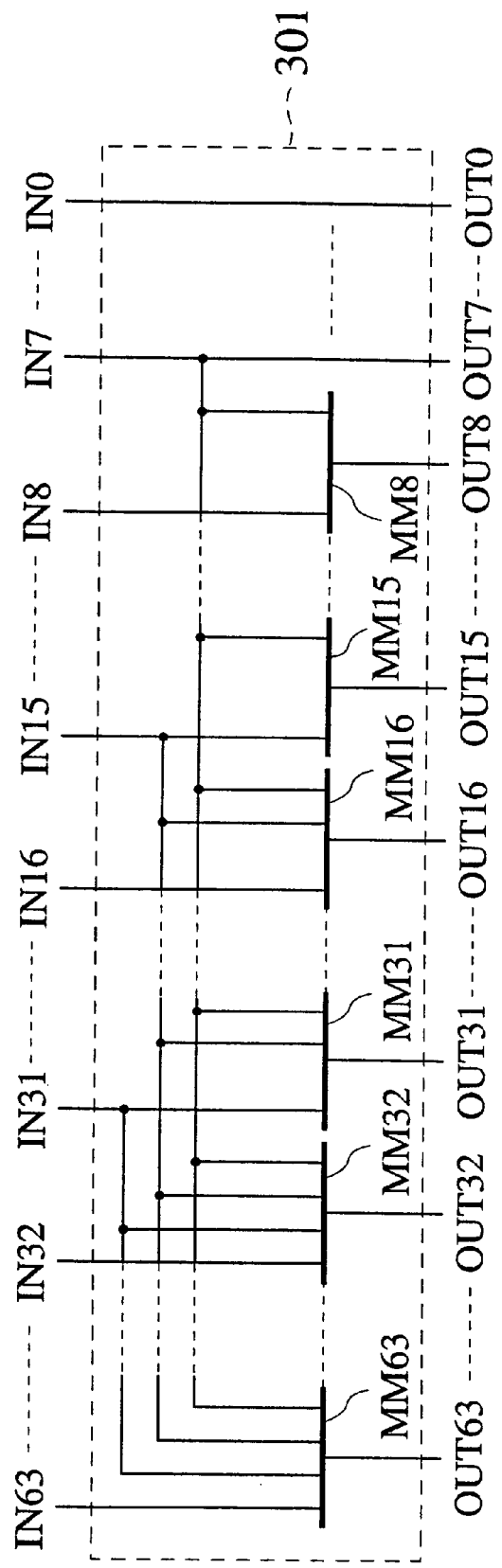
FIG. 1 shows a sign extension unit according to the related art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 2:
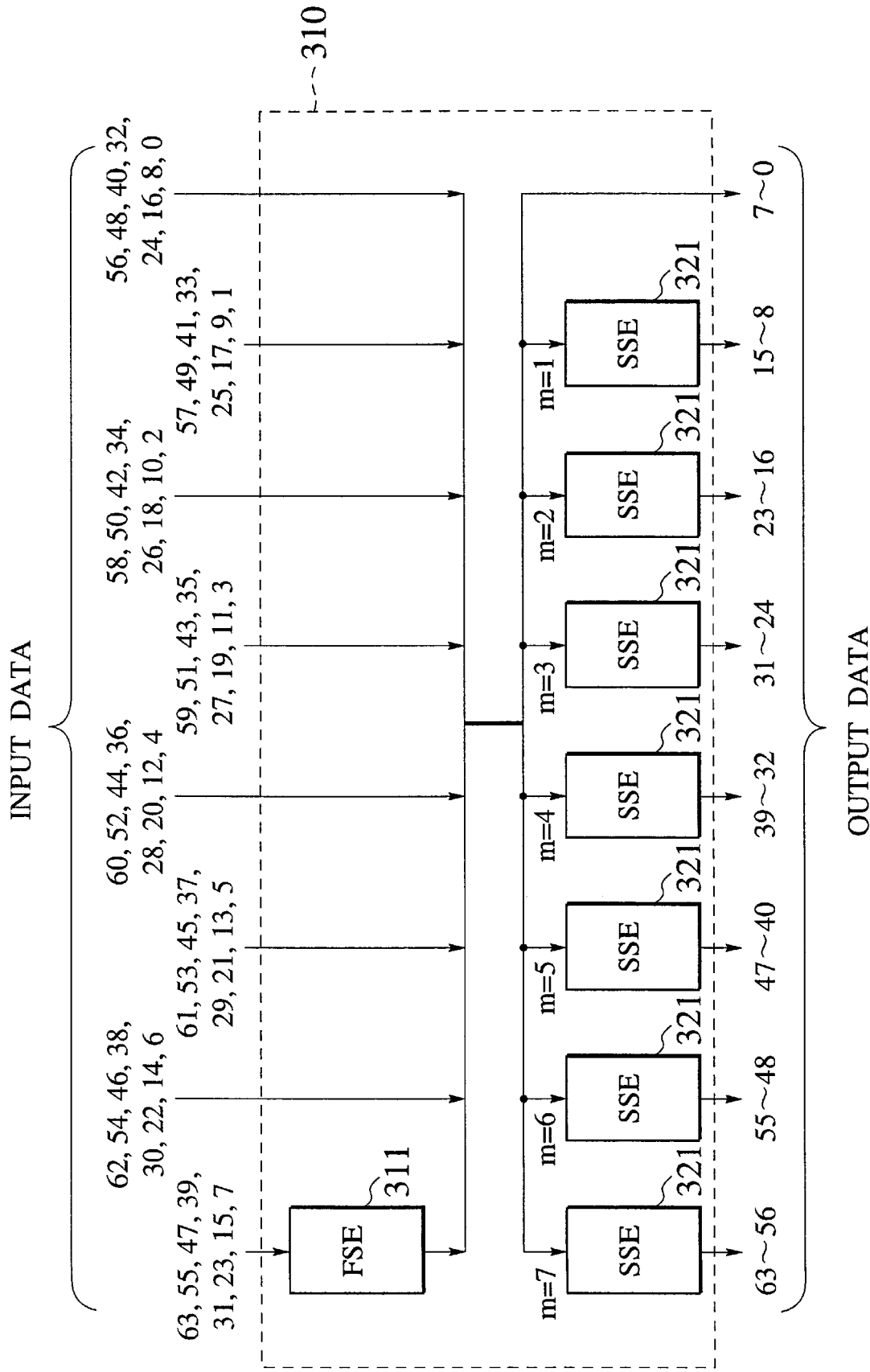
FIG. 2 shows a sign extension unit according to an embodiment of the present invention.

FIG. 2 shows a sign extension unit 310 according to an embodiment of the present invention. The unit 310 receives input data of byte length (8 bits), half-word length (16 bits), word length (32 bits), or double-word length (64 bits) and extends a sign bit thereof to form signed 64-bit output data. Input data to the unit 310 is divided from the least significant bit thereof into n-bit blocks. The unit 310 has a first sign extender (FSE) 311 and seven second sign extenders (SSEs) 321. The first sign extender 311 extends a sign bit of the input data for highest bits of the blocks. The second sign extenders 321 extend the sign bit for the respective blocks according to the bits provided by the first sign extender 311.

In this embodiment, 64-bit input data consisting of bits 0 to 63 is divided by eight from the least significant bit thereof into eight 8-bit blocks. The first sign extender 311 receives the highest bits 7, 15, 23, 31, 39, 47, 55, and 63 from the blocks. In general, input data is divided by "n" into n-bit blocks, and therefore, highest bits of the blocks are expressed as "nL−1" where L is 1, 2, 3, and the like.

Figure 3:
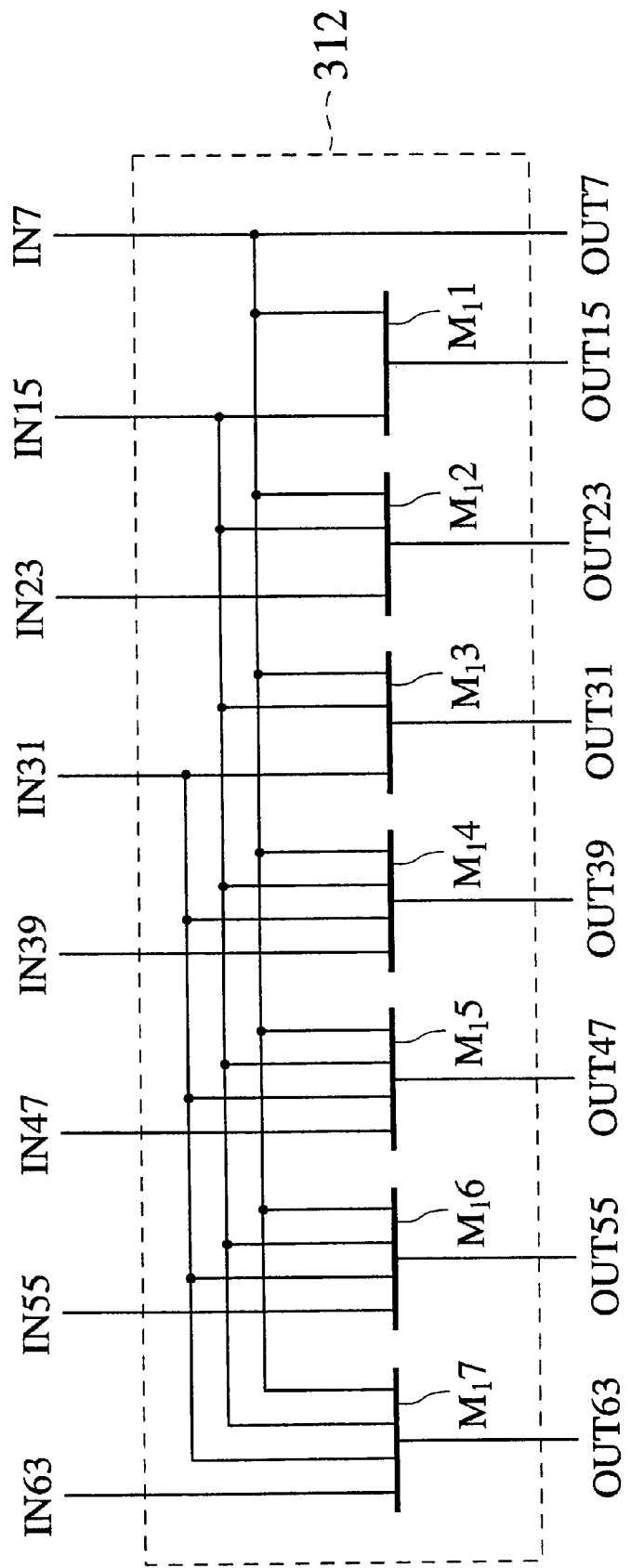
FIG. 3 shows an example of a first sign extender according to the embodiment.

FIG. 3 shows a first sign extender 312 as an example of the first sign extender 311 of FIG. 2. The extender 312 has selectors $M_1 1$ to $M_1 7$. A piece of 64-bit input data consists of bits IN0 to IN63, which are divided by eight into eight 8-bit blocks according to the embodiment. The selector $M_1 1$ receives the highest bit IN7 from the first block (the bits IN0 to IN7) and the highest bit IN15 from the second block (the bits IN8 to IN15), selects one of them, and provides the selected bit as an output bit OUT15. The selector $M_1 2$ receives the highest bits IN7 and IN15 and the highest bit IN23 from the third block (the bits IN16 to IN23), selects one of them, and provides the selected bit as an output bit OUT23. The selector $M_1 3$ receives the highest bits IN7 and IN15 and the highest bit IN31 from the fourth block (the bits IN24 to IN31), selects one of them, and provides the selected bit as an output bit OUT31. The selector $M_1 4$ receives the highest bits IN7, IN15, and IN31 and the highest bit IN39 from the fifth block (the bits IN32 to IN39), selects one of them, and provides the selected bit as an output bit OUT39. The selector $M_1 5$ receives the highest bits IN7, IN15, and IN31 and the highest bit IN47 from the sixth block (the bits IN40 to IN47), selects one of them, and provides the selected bit as an output bit OUT47. The selector $M_1 6$ receives the highest bits IN7, IN15, and IN31 and the highest bit IN55 from the seventh block (the bits IN48 to IN55), selects one of them, and provides the selected bit as an output bit OUT55. The selector $M_1 7$ receives the highest bits IN7, IN15, and IN31 and the highest bit IN63 from the eighth block (the bits IN56 to IN63), selects one of them, and provides the selected bit as an output bit OUT63.

These selectors $M_1 1$ to $M_1 7$ carry out the selection according to the bit length of input data. If the input data is of byte length consisting of bits IN0 to IN7, the selectors $M_1 1$ to $M_1 7$ select each the bit IN7. If the input data is of half-word length consisting of bits IN0 to IN15, the selectors $M_1 1$ to $M_1 7$ select each the bit IN15. If the input data is of word length consisting of bits IN0 to IN31, the selector $M_1 1$ selects the bit IN15, the selector $M_1 2$ the bit IN23, and the selectors $M_1 3$ to $M_1 7$ the bit IN31. If the input data is of double-word length consisting of bits IN0 to IN63, the selector $M_1 1$ to $M_1 7$ select the bits IN15, IN23, IN31, IN39, IN47, IN55, and IN63, respectively.

In this way, the first sign extender 312 receives every eighth bit of input data. If the input data is of 64 bits ranging from bit 0 to bit 63, the extender 312 receives the bits 7, 15, 23, 31, 39, 47, 55, and 63 of the input data. A cache memory of a processor, for example, aligns data eight bits by eight bits so that the data may easily be handled. Accordingly, it is advantageous for the extender 312 to divide input data into 8-bit blocks and manipulate one of the blocks because the data structure of the cache memory can be used as it is by the extender 312. In FIG. 2, the remaining bits other than those handled by the extender 311 are grouped according to the every-eighth-bit grouping to utilize the data structure of the cache memory. It is not always necessary to arrange input bits in the manner of FIG. 2, except those supplied to the first sign extender 311.

Figure 4:
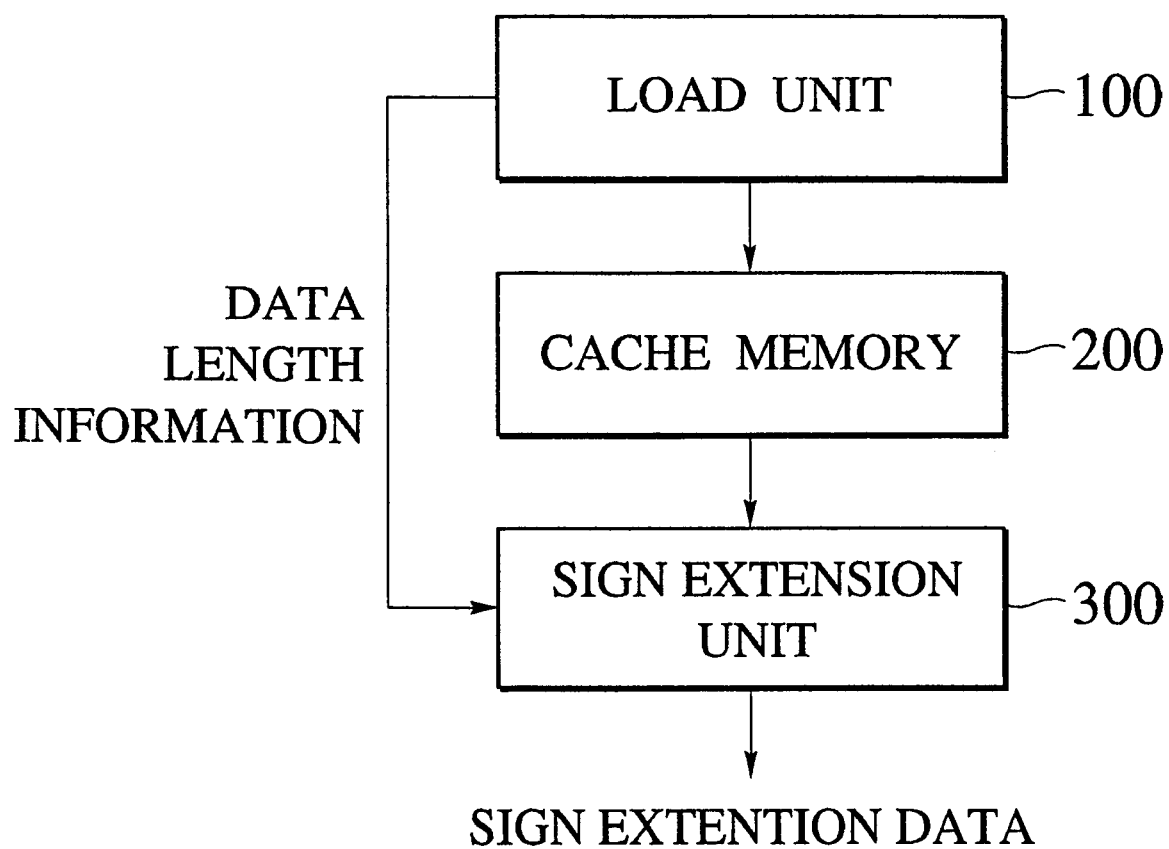
FIG. 4 shows another example of the first sign extender according to the embodiment.

FIG. 4 shows another example of the first sign extender 311 of FIG. 2. In FIG. 4, a load unit 100 provides a given address, a cache memory 200 provides data according to the address from the load unit 100, and a sign extension unit 300 extends a sign of the data provided by the cache memory 200. The address provided by the load unit 100 usually accompanies data length information indicating the bit length of the data stored at the address. Accordingly, the sign extension unit 300 receives the data length information as well.

Figure 5:
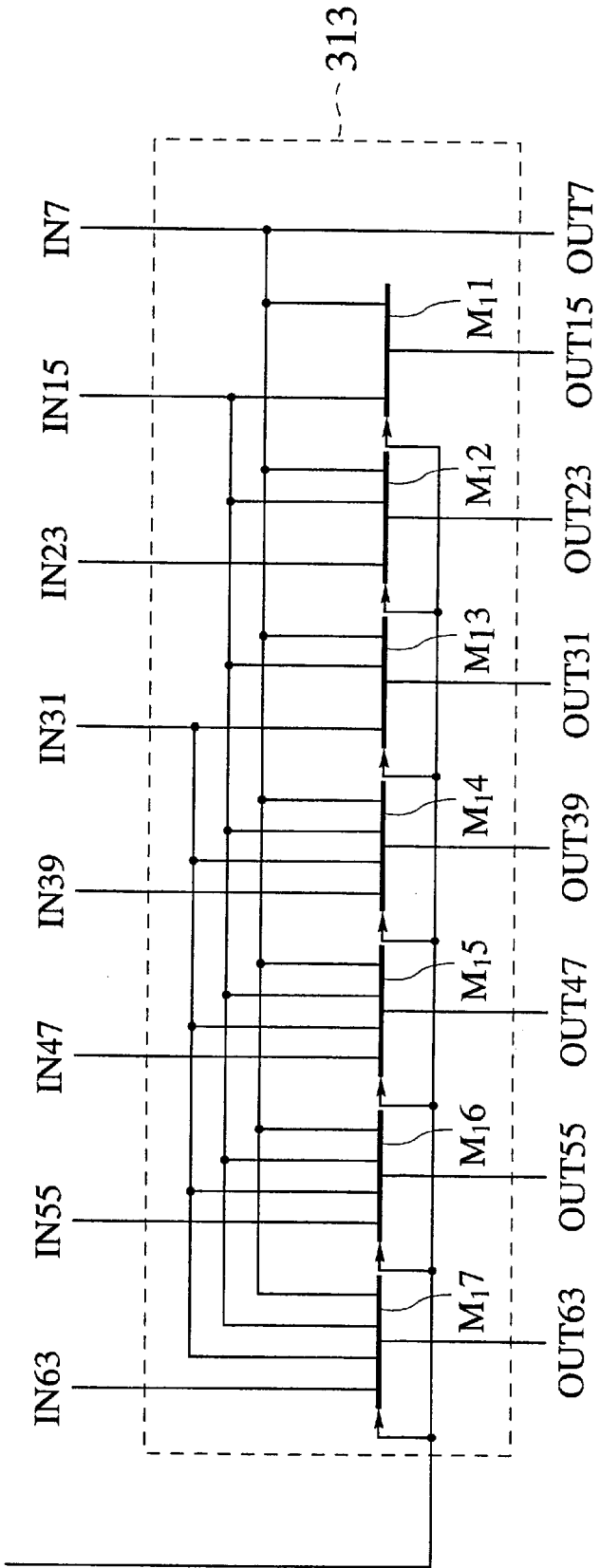
FIG. 5 shows the details of the example of FIG. 4.

FIG. 5 shows a first sign extender 313 serving as the sign extension unit 300 of FIG. 4. Similar to the sign extender 312 of FIG. 3, the sign extender 313 has selectors $M_1 1$ to $M_1 7$ to select bits of input data according to data length information related to the input data. For example, the data length information is "1" if the input data is of 8 bits, "2" if it is of 16 bits, "3" if it is of 32 bits, and "4" if it is of 64 bits. The data length information is supplied to each of the selectors $M_1 1$ to $M_1 7$. If the data length information is "1", the selectors $M_1 1$ to $M_1 7$ select each a bit IN7 from among input bits IN0 to IN7. If the data length information is "2", the selectors $M_1 1$ to $M_1 7$ select each a bit IN15 from among input bits IN0 to IN15. If the data length information is "3", the selector $M_1$ selects a bit IN15, the selector $M_1 2$ a bit IN23, and the selectors $M_1 3$ to $M_1 7$ a bit IN31 from among input bits IN0 to IN31. If the data length information is "4", the selector $M_1 1$ selects a bit IN15, the selector $M_1 2$ a bit IN23, the selector $M_1 4$ a bit IN39, the selector $M_1 5$ a bit IN47, the selector $M_1 6$ a bit IN55, and the selector $M_1 7$ a bit IN63 from among input bits IN0 to IN63.

Figure 6:
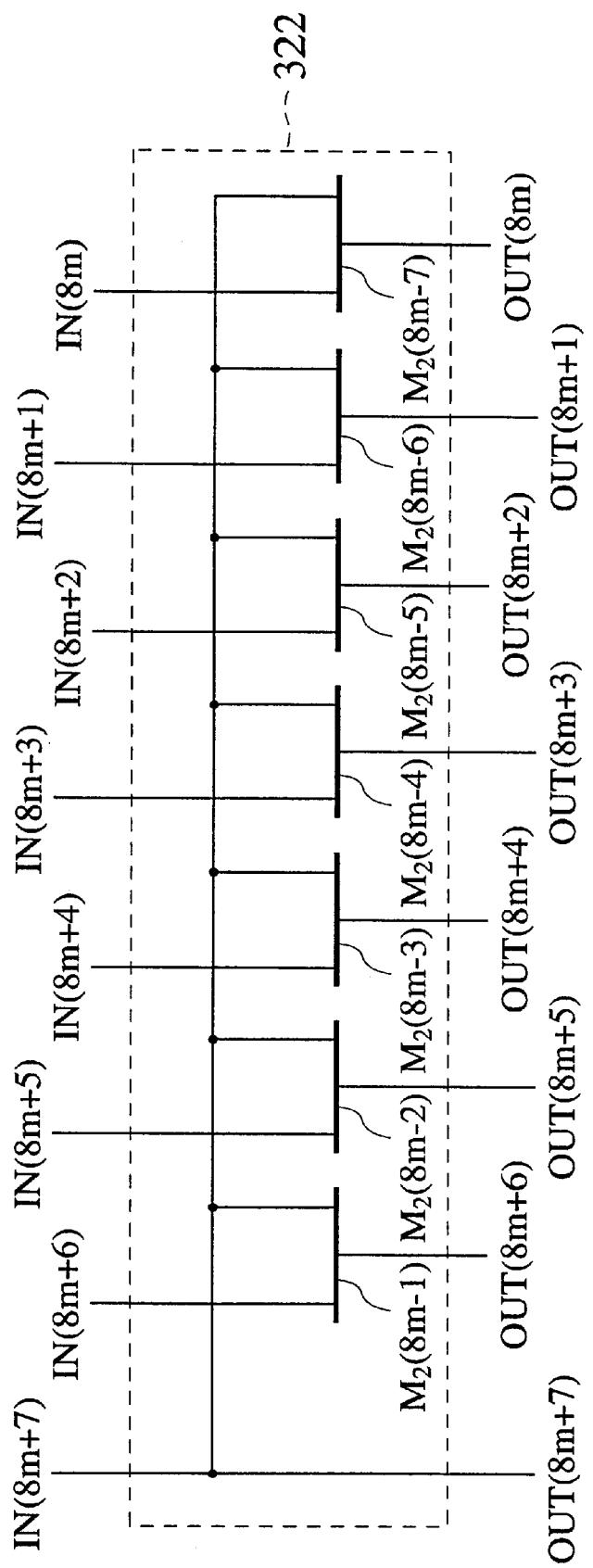
FIG. 6 shows an example of a second sign extender according to the embodiment.

FIG. 6 shows a second sign extender 322 as an example of any one of the second sign extenders 321 of FIG. 2. The extender 322 comprises of selectors $M_2(8m-7)$ to $M_2(8m-1)$ (m being one of 1 to 7). The selector $M_2(8m-7)$ receives an input bit IN(8m) and an output bit OUT(8m+7) of the first sign extender 311, selects one of them, and provides the selected one as an output bit OUT(8m). The selector $M_2(8m-6)$ receives an input bit IN(8m+1) and the output bit OUT(8m+7), selects one of them, and provides the selected one as an output bit OUT(8m+1). The selector $M_2(8m-5)$ receives an input bit IN(8m+2) and the output bit OUT(8m+7), selects one of them, and provides the selected one as an output bit OUT(8m+2). The selector $M_2(8m-4)$ receives an input bit IN(8m+3) and the output bit OUT(8m+7), selects one of them, and provides the selected one as an output bit OUT(8m+3). The selector $M_2(8m-3)$ receives an input bit IN(8m+4) and the output bit OUT(8m+7), selects one of them, and provides the selected one as an output bit OUT (8m+4). The selector $M_2(8m-2)$ receives an input bit IN(8m+5) and the output bit OUT(8m+7), selects one of them, and provides the selected one as an output bit OUT (8m+5). The selector $M_2(8m-1)$ receives an input bit IN(8m+6) and the output bit OUT(8m+7), selects one of them, and provides the selected one as an output bit OUT (8m+6).

The selectors $M_2(8m-7)$ to $M_2(8m-1)$ of the second sign extenders 322 (the second sign extenders 321 in FIG. 2) select bits of input data according to the bit length of input data. If the input data is of byte length, the selectors $M_2(8m-7)$ to $M_2(8m-1)$ select each the output bit OUT (8m+7) of the first sign extender 311. If the input data is of half-word length, the selectors $M_2 1$ to $M_2 7$ select the input bits, and the selectors $M_2(8m-7)$ to $M_2(8m-1)$ (m=2 to 7) select the output bits OUT(8m+7) (m=2 to 7) of the first sign extender 311. If the input data is of word length, the selectors $M_2(8m-7)$ to $M_2(8m-1)$ (m=1 to 3) select the input bits, and the selectors $M_2(8m-7)$ to $M_2(8m-1)$ (m=4 to 7) select the output bits OUT(8m+7) (m=4 to 7) of the first sign extender 311. If the input data is of double-word length, all of the selectors $M_2(8m-7)$ to $M_2(8m-1)$ (m=1 to 7) select the input bits.

The selectors may be structured in various ways according to required functions. For example, they may be structured with logic gates, a combination of logic and transmission gates, or clocked inverters.

Upon receiving input data of byte length consisting of bits IN0 to IN7, the selectors $M_1 1$ to $M_1 7$ of the first sign extender 312 select the sign bit IN7 and provide the selected bit as output bits OUT(8m+7) (m=1 to 7). Then, all of the selectors $M_2(8m-7)$ to $M_2(8m-1)$ (m=1 to 7) of the second sign extenders 322 select and provide the output bits of the first sign extender 312. As a result, the sign bit IN7 of the input data is extended for output bits OUT8 to OUT63 to provide signed 64-bit output data.

Upon receiving input data of half-word length consisting of bits IN0 to IN15, the selectors $M_1 1$ to $M_1 7$ of the first sign extender 312 select the sign bit IN15 and provide the selected bit as output bits OUT(8m+7) (m=1 to 7). Then, the selectors $M_2 1$ to $M_2 7$ of the first one of the second sign extenders 322 select the input bits IN8 to IN14 and provide the selected bits as output bits OUT8 to OUT14. At the same time, the selectors $M_2(8m-7)$ to $M_2(8m-1)$ (m=2 to 7) of the other extenders 322 select the output bits of the first sign extender 311 and provide the selected bits as output bits OUT16 to OUT63. As a result, the sign bit IN15 of the input data is extended for the output bits OUT16 to OUT63 to provide signed 64-bit output data.

Upon receiving input data of word length consisting of bits IN0 to IN31, the selectors $M_1 3$ to $M_1 7$ of the first sign extender 312 select the sign bit IN31 and provide the selected bit as output bits OUT(8m+7) (m=3 to 7). At this time, the selector $M_1 1$ selects the input bit IN15 and the selector $M_1 2$ the input bit IN23. Then, the selectors $M_2(8m-7)$ to $M_2(8m-1)$ (m=1 to 3) of the second sign extenders 322 select the input bits IN8 to IN31 and provide the selected bits as output bits OUT8 to OUT31. The selectors $M_2(8m-7)$ to $M_2(8m-1)$ (m=4 to 7) of the remaining second sign extenders 322 select the output bits of the first sign extender 312 and provide the selected bits as output bits OUT32 to OUT63. As a result, the sign bit IN31 of the input data is extended for the output bits OUT32 to OUT63 to provide signed 64-bit output data.

Upon receiving input data of double-word length consisting of bits IN0 to IN63, all of the selectors of the first and second sign extenders 312 and 322 select the input bits IN0 to IN63 to form output bits OUT0 to OUT63.

In this way, the present invention limits the number of bits for which a sign bit is extended, to "n–1" or "(output bit length/n)–1" where "n" is the number of bits contained in each block when input data is divided into blocks. This technique greatly reduces load capacitance and wiring capacitance when extending input data to output data of long bit length. Input and output bits handled by the first and second sign extenders 311 and 321 of the present invention are juxtaposed, and load on a sign bit in each of the sign extenders is limited to the gates and wiring of the seven selectors of the extender. As a result, the present invention greatly reduces load on paths for transmitting a sign bit and improves operation speed compared with the related art.

In the above explanation, input data consists of 8, 16, 32, or 64 bits, sign-extended output data consists of 64 bits, and input data is divided into 8-bit blocks. These examples do not limit the present invention. For example, the present invention is applicable to handle $2^n$-bit data.

In summary, the present invention divides input data into n-bit blocks, extends a sign bit of the input data for highest bits of the n-bit blocks, and extends the sign bit in the n-bit blocks according to the highest bits of the blocks. The present invention limits the number of bits for which a sign bit is extended, to "n–1" or "(output bit length n)–1." As a result, the present invention reduces load on paths for transmitting a sign bit and improves operation speed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A sign extension unit for extending a sign bit of input data and generating signed output data, the input data consisting of input bits that are divided into blocks, the sign extension unit comprising:
    a first sign extender for receiving highest bits from the blocks, selecting at least one of the received bits according to the bit length of the input data with the sign bit being always selected, and providing the selected at least one bit as a highest bit from the blocks; and
    a second sign extender for receiving the bits of the blocks except those of a lowest one of the blocks and for receiving the selected at least one bit from the first sign extender, selecting, in each of the blocks except the lowest block, the highest bit of the block or the bits of the block according to the bit length of the input data, and providing the selected bits.

2. The sign extension unit of claim 1, wherein the first sign extender has:
    a plurality of selectors for receiving the highest bits from the blocks, each selector selecting at least one of the received bits according to data length information related to the input data with the sign bit being always selected, and providing the selected at least one bit respectively.

3. A sign extension unit for extending a sign bit of input data to the higher side of the input data and generating signed output data, the input data consisting of input bits which are divided into blocks and among which the most significant one is the sign bit of the input data, the sign extension unit comprising:
    a first sign extender for receiving juxtaposed highest bits from the blocks, selecting at least one of the received bits according to the bit length of the input data with the sign bit being always selected, and extending the sign bit for the highest bits of the blocks that are higher than the block that contains the sign bit; and
    a second sign extender for receiving the juxtaposed bits of the blocks except those of a lowest one of the blocks and for receiving the extended sign bit for the highest bits of the blocks as provided by the first sign extender, selecting, in each of the blocks except the lowest block, the highest bit of the block or the bits of the block according to the bit length of the input data, and extending the sign bit for all bits in each of the blocks having the highest bits for which the first sign extender has extended the sign bit.

4. A sign extension unit for extending a sign bit of input data to the higher side of the input data and generating signed 64-bit output data consisting of bit 0 to bit 63, the input data consisting of 8, 16, 32, or 64 input bits which are grouped from the least significant bit thereof into 8-bit blocks ranging from block 0 to block 7, the most significant bit of the input bits being the sign bit of the input data, the sign extension unit comprising:

a first extender for receiving juxtaposed highest bits (8m−1; m=1, 2, . . . , 8) from the blocks, extending a bit 7 of the input data for the highest bits (8m−1; m=2, 3, . . . , 8) of the blocks 1 to 7 if the input data consists of 8 bits ranging from bit 0 to bit 7, extending a bit 15 of the input data for the highest bits (8m−1; m=3, 4, . . . , 8) of the blocks 2 to 7 if the input data consists of 16 bits ranging from bit 0 to bit 15, and extending a bit 31 of the input data for the highest bits (8m−1; m=5, 6, . . . , 8) of the blocks 4 to 7 if the input data consists of 32 bits ranging from bit 0 to bit 31; and a second extender for receiving any extended bits from the first extender and for receiving juxtaposed bits from the blocks 1 to 7, extending the bits (8m−1; m=2, 3, . . . , 8) of the blocks 1 to 7 to the bits (8n+6; n=1, 2, . . . , 7) of the same blocks if the input data consists of 8 bits, extending the bits (8m−1; m=3, 4, . . . , 8) of the blocks 2 to 7 to the bits (8n+6; n=2, 3, . . . , 7) of the same blocks if the input data consists of 16 bits, and extending the bits (8m−1; m=5, 6, . . . , 8) of the blocks 4 to 7 to the bits (8n+6; n=4, 5, . . . , 7) of the same blocks if the input data consists of 32 bits.

5. The sign extension unit of claim 4, wherein the first sign extender has:

a first selector for selecting one of the input bits 7 and 15 and providing the selected one as the output bit 15;

a second selector for selecting one of the input bits 7, 15, and 23 and providing the selected one as the output bit 23;

a third selector for selecting one of the input bits 7, 15, and 31 and providing the selected one as the output bit 31;

a fourth selector for selecting one of the input bits 7, 15, 31, and 39 and providing the selected one as the output bit 39;

a fifth selector for selecting one of the input bits 7, 15, 31, and 47 and providing the selected one as the output bit 47;

a sixth selector for selecting one of the input bits 7, 15, 31, and 55 and providing the selected one as the output bit 55; and a seventh selector for selecting one of the input bits 7, 15, 31, and 63 and providing the selected one as the output bit 63.

6. The sign extension unit of claim 4, wherein the first sign extender has:

a first selector for receiving the input bits 7 and 15 and data length information, selecting one of the received bits according to the data length information, and providing the selected one as the output bit 15;

a second selector for receiving the input bits 7, 15, and 23 and the data length information, selecting one of the received bits according to the data length information, and providing the selected one as the output bit 23;

a third selector for receiving the input bits 7, 15, and 31 and the data length information, selecting one of the received bits according to the data length information, and providing the selected one as the output bit 31;

a fourth selector for receiving the input bits 7, 15, 31, and 39 and the data length information, selecting one of the received bits according to the data length information, and providing the selected one as the output bit 39;

a fifth selector for receiving the input bits 7, 15, 31, and 47 and the data length information, selecting one of the received bits according to the data length information, and providing the selected one as the output bit 47;

a sixth selector for receiving the input bits 7, 15, 31, and 55 and the data length information, selecting one of the received bits according to the data length information, and providing the selected one as the output bit 55; and a seventh selector for receiving the input bits 7, 15, 31, and 63 and the data length information, selecting one of the received bits according to the data length information, and providing the selected one as the output bit 63.

7. The sign extension unit of claim 4, wherein the second sign extender has:

seven selectors for selecting the input bits (8m) (m=1, 2, . . . , 7) or the output bits (8m+7) of the first sign extender and providing the selected bits as the output bits (8m);

seven selectors for selecting the input bits (8m+1) or the output bits (8m+7) of the first sign extender and providing the selected bits as the output bits (8m+1);

seven selectors for selecting the input bits (8m+2) or the output bits (8m+7) of the first sign extender and providing the selected bits as the output bits (8m+2);

seven selectors for selecting the input bits (8m+3) or the output bits (8m+7) of the first sign extender and providing the selected bits as the output bits (8m+3);

seven selectors for selecting the input bits (8m+4) or the output bits (8m+7) of the first sign extender and providing the selected bits as the output bits (8m+4);

seven selectors for selecting the input bits (8m+5) or the output bits (8m+7) of the first sign extender and providing the selected bits as the output bits (8m+5); and seven selectors for selecting the input bits (8m+6) or the output bits (8m+7) of the first sign extender and providing the selected bits as the output bits (8m+6).

* * * * *